United States Patent
Matsumoto

(10) Patent No.: US 7,463,567 B2
(45) Date of Patent: Dec. 9, 2008

(54) OPTICAL DISC RECORDING/REPRODUCING APPARATUS CAPABLE OF RAPIDLY DETERMINING UNRECORDED DISC

(75) Inventor: Masaki Matsumoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 443 days.

(21) Appl. No.: 11/237,005

(22) Filed: Sep. 28, 2005

(65) Prior Publication Data

US 2006/0072389 A1 Apr. 6, 2006

(30) Foreign Application Priority Data

Oct. 1, 2004 (JP) ............................. 2004-290326

(51) Int. Cl.
*G11B 7/00* (2006.01)

(52) U.S. Cl. .............. 369/53.24; 369/53.22; 369/53.37; 369/53.1

(58) Field of Classification Search .............. 369/53.22, 369/53.24, 53.37, 53.1
See application file for complete search history.

(56) References Cited

U.S. PATENT DOCUMENTS

| | | | | |
|---|---|---|---|---|
| 5,740,152 A | * | 4/1998 | Yokogawa et al. | 369/275.3 |
| 5,745,460 A | * | 4/1998 | Tateishi | 369/53.22 |
| 5,764,610 A | * | 6/1998 | Yoshida et al. | 369/53.22 |
| 5,959,955 A | * | 9/1999 | Choi | 369/53.23 |
| 5,966,357 A | * | 10/1999 | Ryoo | 369/53.23 |
| 6,256,277 B1 | * | 7/2001 | Saga et al. | 369/59.24 |
| 6,304,535 B1 | * | 10/2001 | Magome et al. | 369/53.2 |
| 6,411,577 B1 | * | 6/2002 | Hirose | 369/53.22 |
| 6,801,488 B2 | * | 10/2004 | Kato et al. | 369/47.28 |
| 6,868,052 B2 | * | 3/2005 | Konno et al. | 369/53.23 |
| 2002/0181370 A1 | * | 12/2002 | Yamanoi et al. | 369/53.22 |
| 2003/0021202 A1 | * | 1/2003 | Usui et al. | 369/47.39 |
| 2003/0123358 A1 | * | 7/2003 | Kanda et al. | 369/53.22 |
| 2004/0001401 A1 | * | 1/2004 | Yamaguchi | 369/44.26 |

FOREIGN PATENT DOCUMENTS

| | | |
|---|---|---|
| JP | 6-267179 | 9/1994 |
| JP | 2003-263755 | 9/2003 |

OTHER PUBLICATIONS

Patent Abstracts of Japan, Publication No. 06-267179, Publication Date: Sep. 22, 1994, 1 page.
Patent Abstracts of Japan, Publication No. 2003-263755, Publication Date: Sep. 19, 2003, 1 page.

* cited by examiner

*Primary Examiner*—Tan X Dinh
*Assistant Examiner*—Thomas D Alunkal
(74) *Attorney, Agent, or Firm*—Osha • Liang LLP

(57) ABSTRACT

An optical disc recording/reproducing apparatus according to the present invention determines the state of recording of an optical disc on the basis of the detection period of longest pits recorded on the optical disc wherein the period is changed with the acceleration of the rotation of the optical disc until a predetermined rotation speed is achieved. This enables rapidly determining whether the optical disc is unrecorded disc or a recorded disc.

3 Claims, 5 Drawing Sheets

OPTICAL DISC RECORDING/REPRODUCING APPARATUS CAPABLE OF RAPIDLY DETERMINING UNRECORDED DISC

BACKGROUND OF THE INVENTION

1. Field of the Invention

The present invention relates to an optical disc recording/reproducing apparatus for recording and/or reproducing information onto and/or from an optical disc such as a CD (Compact Disc) or a DVD (Digital Versatile Disc).

2. Description of the Background Art

Conventionally, there is an optical disc recording/reproducing apparatus for recording and/or reproducing information onto and/or from an optical disc, such as a CD or a DVD, which has concentric or centrifugal information recording tracks formed thereon, with the use of an optical head called an optical pickup. The optical pickup is configured to focuses and apply light of a semiconductor laser or the like onto an optical disc through an objective lens, receive the reflected light from the optical disc and output electrical signals corresponding thereto. The optical pickup moves in the radial direction of the optical disc.

An optical disc recording/reproducing apparatus allows an optical pickup to move to a predetermined position on an optical disc and focuses and applies light from the optical pickup to the recording tracks on the optical disc while rotating the optical disc, thereby recording and/or reproducing information onto and/or from the optical disc.

For reproducing information from the optical disc, the optical disc recording/reproducing apparatus performs "focus-on" (focus drawing) of light emitted from the optical pickup such that the focus point of the light is positioned on the optical disc surface and then performs "track-on" (track drawing) of the focused-on light such that the light is positioned on the recording tracks. These focus-on and track-on are performed by moving the objective lens in the direction perpendicular to the optical disc surface and in the direction perpendicular to the recording tracks, in accordance with electrical signals output from the optical pickup. Further, in the focus-on and track-on state, pits formed on the optical disc are detected on the basis of electrical signals output from the optical pickup; thus, information is read from the optical disc and the information is reproduced. Recording of information onto the optical disc is performed by forming pits on recording tracks of the optical disc with light which is emitted from the optical pickup and focused onto the optical disc.

Generally, on a reproduction-only optical disc on which music and images have been previously recorded, information indicating the content of recorded data in the optical disc and information about operation programs and the like are recorded at the innermost circumferential side of the recording tracks. Also, in the case of an optical disc onto which a user can record information, the information is successively recorded thereon from the innermost circumferential side of the recording tracks.

Consequently, for example, when an optical disc is mounted into the apparatus main body, the optical disc recording/reproducing apparatus performs an initial operation of reading information recorded at the innermost circumferential side of the optical disc and determines the type of the optical disc and the content of recorded data therein on the basis of the information read by the initial operation. Then, the optical disc recording/reproducing apparatus controls subsequent recording or reproducing operations. During the initial operation, the light from the optical pickup is focused-on and tracked-on at a prescribed initial position which is slightly closer to the outer periphery than the innermost circumferential side of the recording tracks with a slight margin.

On the other hand, if a user erroneously mounts an unrecorded optical disc into an optical disc recording/reproducing apparatus, the optical disc recording/reproducing apparatus will search for tracks including data recorded thereon. Therefore, in such a case, the optical disc recording/reproducing apparatus has been out of control while keeping searching for tracks, in some cases. More specifically, since no pit is formed at the position on which light from the optical pickup is focused on during the initial operation, the optical disc recording/reproducing apparatus can not perform track-on even if it tries track-on. As a result, the focusing fails and recorded information can not be read. Further, if focusing fails, the optical disc recording/reproducing apparatus retries track-on several times and determines that the optical disc is an unrecorded disc in the event of time-out, in many cases. Such determination requires a long time. Japanese Laid-Open Patent Publication No. 06-267179 discloses a method which determines whether or not sub-code signal components or synchronization signal components are read from an optical disc, as a method for determining an unrecorded portion other than the method employing time-out. Japanese Laid-Open Patent Publication No. 2003-263755 also discloses a method which determines recorded portions and unrecorded portions by confirming the detection period of pits.

However, any of the methods disclosed in the aforementioned publications require some time since they performs the determination after an optical disc is mounted and starts to rotate, then it reaches to a normal rotation speed and the preparation for the initial operation is completed.

SUMMARY OF THE INVENTION

The present invention has been made for overcoming the aforementioned problems and aims to provide an optical disc recording/reproducing apparatus capable of rapidly determining an unrecorded disc during the preparation stage for an initial operation.

An optical disc recording/reproducing apparatus according to the present invention includes: a control unit which, when an optical disc has been inserted, executes reading of information recorded on the optical disc; a motor for rotating the optical disc at a predetermined rotation speed in response to commands from the control unit; an information reading part for applying light to the optical disc in response to commands from the control unit and, also, receiving reflected light from pits recorded on the optical disc to output signals based on the recorded pits; and a determination part for determining the condition of recording of the optical disc on the basis of signals output from the information reading part. The information reading part includes: an optical pickup for applying light to the optical disc and, also, receiving reflected light from pits recorded on the optical disc to convert the reflected light into electrical signals and, then, output the electrical signals; a signal processing unit for subjecting electrical signals from the optical pickup to signal processing to generate RF signals; a data slice signal generation unit for processing the RF signals to generate data slice signals; and a focusing control unit for performing focus-on of light to be applied such that the focus point of the light is positioned on the surface of the optical disc. The determination part determines the condition of recording of the optical disc on the basis of the detection period of signals from longest pits recorded on the optical disc, wherein the period is changed with the acceleration of the rotation of the optical disc until the predetermined rotation speed is achieved. The determination part includes: a pulse-width counter for measuring the pulse widths of the data slice signals; a maximum-value detection circuit for detecting the maximum pulse-width value of the longest pits measured by the pulse-width counter; and a determination circuit for calculating the detection period of the maximum values detected by the maximum-value detection circuit and for determining the condition of recording of the optical disc on the basis of the change of the detection period of the maximum values. The determination circuit determines that the optical disc is a recorded disc when the detection period of the maximum values detected by the maximum-value detection circuit is shortened with the acceleration of the rotation of the optical disc.

An optical disc recording/reproducing apparatus according to the present invention includes: a control unit which, when an optical disc has been inserted, executes reading of information recorded on the optical disc; a motor for rotating the optical disc at a predetermined rotation speed in response to commands from the control unit; an information reading part for applying light to the optical disc in response to commands from the control unit and, also, receiving reflected light from pits recorded on the optical disc to output signals based on the recorded pits; and a determination part for determining the condition of recording of the optical disc on the basis of signals output from the information reading part. The determination part determines the condition of recording of the optical disc on the basis of the detection period of signals from longest pits recorded on the optical disc, wherein the period is changed with the acceleration of the rotation of the optical disc until the predetermined rotation speed is achieved.

Preferably, the information reading part includes: an optical pickup for applying light to the optical disc and, also, receiving reflected light from pits recorded on the optical disc to convert the reflected light into electrical signals and, then, output the electrical signals; a signal processing unit for subjecting electrical signals from the optical pickup to signal processing to generate RF signals; a data slice signal generation unit for processing the RF signals to generate data slice signals; and a focusing control unit for performing focus-on of light to be applied such that the focus point of the light is positioned on the surface of the optical disc.

In particular, the determination part includes: a pulse-width counter for measuring the pulse widths of the data slice signals; a maximum-value detection circuit for detecting the maximum pulse-width value of the longest pits measured by the pulse-width counter; and a determination circuit for calculating the detection period of the maximum values detected by the maximum-value detection circuit and for determining the condition of recording of the optical disc on the basis of the change of the detection period of the maximum values.

In particular, the determination circuit determines that the optical disc is a recorded disc when the detection period of the maximum values detected by the maximum-value detection circuit is shortened with the acceleration of the rotation of the optical disc.

An optical disc recording/reproducing apparatus according to the present invention determines the state of recording of an optical disc on the basis of the detection period of longest pits recorded on the optical disc wherein the period is changed with the acceleration of the rotation of the optical disc until a predetermined rotation speed is achieved. Therefore, the optical disc recording/reproducing apparatus enables rapidly determining whether the optical disc is unrecorded disc or a recorded disc.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
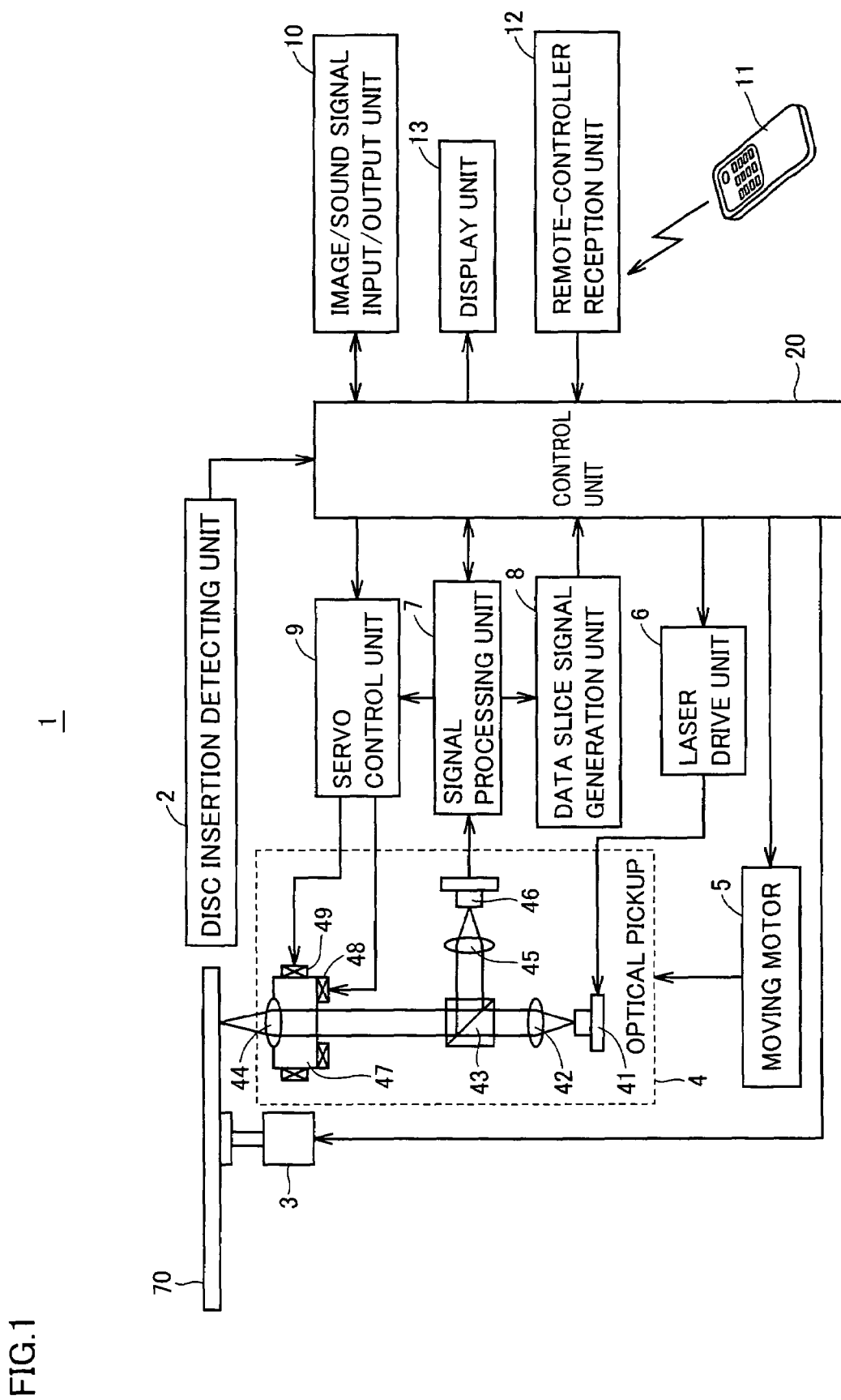
FIG. 1 is a schematic block diagram of an optical disc recording/reproducing apparatus according to an embodiment of the present invention.

Hereinafter, embodiments of the present invention will be described in detail with reference to the drawings. In the drawings, like reference characters refer to like or corresponding elements and description thereof will not be repeated.

Referring to FIG. 1, an optical disc recording/reproducing apparatus 1 according to an embodiment of the present invention performs recording and/or reproduction of information such as music, images and the like onto and/or from an optical disc 70, such as a CD or a DVD, having concentric or centrifugal information recording tracks formed thereon.

Optical disc recording/reproducing-apparatus 1 includes a disc insertion detecting unit 2, a spindle motor 3, an optical pickup 4, a moving motor 5, a laser drive unit 6, a signal processing unit 7, a data slice signal generation unit 8 and a servo control unit (focusing control unit, tracking control unit) 9. Optical disc recording/reproducing apparatus 1 also includes an image/sound signal input/output unit 10, a remote controller 11, a remote-controller reception unit 12, a display unit 13 and a control unit 20 for controlling the aforementioned respective units. Further, control unit 20 includes a determination section for determining an unrecorded disc on receiving data slice signals from data slice signal generation unit 8, which will be described later.

Further, optical pickup 4, signal processing unit 7, data slice signal generation unit 8 and servo control unit 9 constitute an information reader.

Disc insertion detecting unit 2 detects optical disc 70 being inserted from a disc insertion unit (not shown) and inputs signals indicative thereof to control unit 20. The inserted optical disc 70 is mounted to spindle motor 3. Spindle motor 3 is driven to rotate in accordance with commands from control unit 20 and is controlled to rotate the mounted optical disc 70 at a predetermined speed.

Optical pickup 4 applies light for recording and/or reproduction of information onto and/or from optical disc 70 and, also, receives the reflected light from optical disc 70, converts it into electrical signals and outputs them. Optical pickup 4 is moved over optical disc 70 in the radial direction thereof by moving motor 5 constituted by a linear motor, on the basis of commands from control unit 20.

Optical pickup 4 focuses light emitted from a semiconductor laser 41 and applies the light to optical disc 70 through a collimating lens 42, a beam splitter 43 and an objective lens 44. Further, the reflected light from optical disc 70 is received at a photodetector 46 through objective lens 44, beam splitter 43 and a condenser lens 45.

The light emission of semiconductor laser 41 is controlled by laser drive unit 6 which operates in accordance with commands from control unit 20. Photodetector 46 is constituted by a split photodiode having a light-receiving surface divided into a plurality of regions for outputting electrical signals depending on the light intensities received at the respective light-receiving surface regions. Output signals from photodetector 46 are input to signal processing unit 7.

Objective lens 44 is held by a lens holder 47 which is provided with a focusing coil 48 and a tracking coil 49. Focusing coil 48 is used for moving objective lens 44 in the direction perpendicular to the disc surface of optical disc 70 through the magnetic effect of a magnet (not shown). Further, tracking coil 49 is used for moving objective lens 44 in the direction perpendicular to the recording tracks on optical disc 70 in parallel with the disc surface of optical disc 70.

Signal processing unit 7 generates RF signals (reflection intensities) on the basis of output signals from photodetector 46 and outputs them to data slice signal processing unit 8. The data slice signal generation unit 8 generates data slice signals by binarizing the RF signals and inputs them to control unit 20. Control unit 20 detects pits formed on optical disc 70 on the basis of the data slice signals.

Further, signal processing unit 7 generates focus error signals and track error signals on the basis of output signals from photodetector 46 and outputs them to servo control unit 9. Focus error signals are signals corresponding to the amount of deviation of the focus point of the light which is applied to optical disc 70 through objective lens 44 from the surface of optical disc 70, and track error signals are signals corresponding to the amount of deviation of the focus point from the recording tracks.

Servo control unit 9 performs servo control for controlling the electric currents supplied to focusing coil 48 and tracking coil 49 on the basis of these focus error signals and track error signals to move objective lens 44 such that the focus point is positioned on the disc surface of optical disc 70 and on the recording tracks.

Image/sound signal input/output unit 10 is connected to external apparatuses such as a display, a loudspeaker and a television receiver which are not shown. Through image/sound signal input/output unit 10, image signals or sound signals reproduced from optical disc 70 are output and image signals or sound signals from the external apparatus are input.

Remote controller 11 is used for manipulating various kinds of operations of optical disc recording/reproducing apparatus 1 and includes operation keys (not shown) for manipulating the various kinds of operations. In response to manipulations of the keys, remote controller 7 sends infrared ray signals which are signals corresponding to such key manipulation. Remote controller reception unit 12 receives the infrared ray signals sent from remote controller 11 and outputs the signals to control unit 20. Display unit 13 is provided on the front panel of the main body of optical disc recording/reproducing apparatus 1 and displays the content of operations performed on remote controller 11 and also displays the condition of operations of optical disc recording/reproducing apparatus 1.

Hereinafter, recording/reproduction of information onto and/or from optical disc 70 will be described. First, for reproduction of information from optical disc 70, light from semiconductor laser 41 is applied to optical disc 70 and the reflected light is received at photodetector 46 while optical disc 70 is rotated at a predetermined speed by spindle motor 3. Further, servo control unit 9 controls the electric current supplied to focusing coil 48 on the basis of focus error signals from signal processing unit 7 to move objective lens 44 for performing focus-on (focus drawing) such that the focus point of the light from semiconductor lens 41 is positioned on the surface of optical disc 70. Further, servo control unit 9 controls the electric current supplied to tracking coil 49 on the basis of tracking error signals from signal processing unit 7 to move objective lens 44 for performing track-on (track drawing) such that the focus point of the light from semiconductor lens 41 is positioned on a desired recording track.

After completing focus-on and track-on, servo control unit 9 performs focusing servo control and tracking servo control by controlling the electric currents supplied to focusing coil 48 and tracking coil 49 on the basis of focus error signals and tracking error signals to move objective lens 44 such that the focus-on state and the track-on state are maintained.

Then, in the servo state, RF signals output from signal processing unit 7 are input to data slice signal generation unit 8 and data slice signal generation unit 8 binarizes the RF signals into data slice signals and inputs them to control unit 20. Control unit 20 detects the presence or absence of pits formed on optical disc 70 on the basis of the data slice signals, reads information recorded on optical disc 70 and reproduces the read information into image signals or sound signals. The image signals or sound signals are output from image/sound signal input/output unit 10 to the external apparatus.

Further, recording of information onto optical disc 70 is performed by forming pits on optical disc 70 with light from semiconductor laser 41 in the focusing and tracking servo states. At this time, image signals or sound signals input from image/sound signal input/output unit 10 are coded by control unit 20 and semiconductor laser 41 is controlled to generate light in accordance with the coded data under the control by control unit 20. Thus, pits according to the coded data are formed on the recording tracks on optical disc 70, so that information of images or sounds is recorded thereon. Semiconductor laser 41 is caused to generate higher-output light than for reading of information in order to enable the formation of pits.

Optical disc recording/reproducing apparatus 1 having the aforementioned configuration performs reproduction of information from optical disc 70 and recording of information onto optical disc 70 under the control of control unit 20 when remote controller 11 is manipulated. Further, when optical disc 70 is inserted, optical disc recording/reproducing apparatus 1 performs an initial operation for reading information recorded at the innermost circumferential side of optical disc 70 under the control of control unit 20. Then, on the basis of the information read during the initial operation, optical disc recording/reproducing apparatus 1 determines the type of the inserted optical disc 70 and the content of recorded data thereon and then controls subsequent operations such as recording or reproduction of information.

Hereinafter, there will be described a method for determining an unrecorded disc according to an embodiment of the present invention. The determination of an unrecorded disc according to an embodiment of the present invention is a method for executing the determination using data slice signals during a preparation stage for an initial operation.

Figure 2:
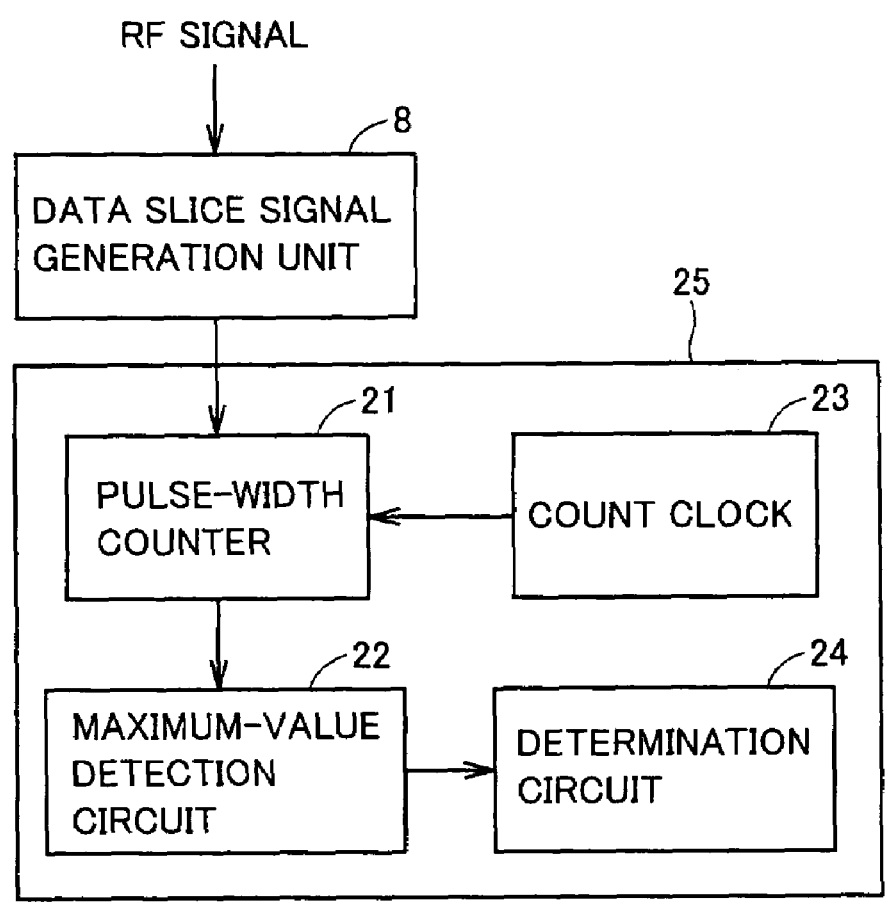
FIG. 2 is a schematic block diagram for illustrating a determination section included in a control unit.

Referring to FIG. 2, a determination section 25 included in control unit 20 will be described.

Determination section 25 includes a pulse-width counter 21, a maximum-value detection circuit 22, a count clock 23 and a determination circuit 24. Count clock 23 outputs predetermined timing signals to pulse-width counter 21. Pulse-width counter 21 outputs the pulse-width values of data slice signals from data slice signal generation unit 8 to maximum-value detection circuit 22, in accordance with the timing signals input thereto. Maximum-value detection circuit 22 detects the maximum pulse-width value and outputs it to determination circuit 24. Determination circuit 24 receives the input maximum pulse-width value input from maximum-value detection circuit 22, and determines whether the optical disc is an unrecorded disc or a recorded disc.

Figure 3:
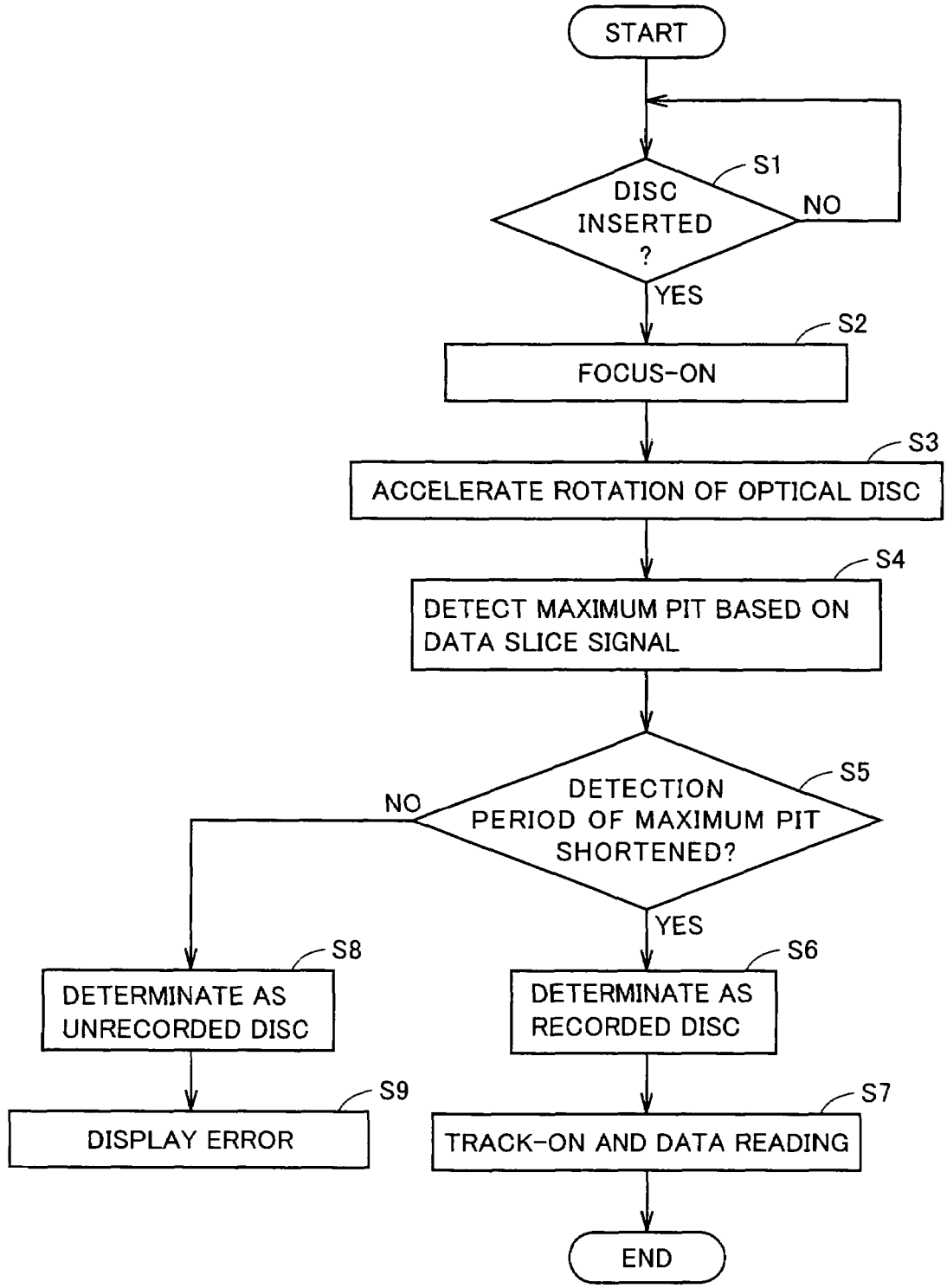
FIG. 3 is a flow chart for describing an initial operation at the time of inserting an optical disc into an optical disc recording/reproducing apparatus according to an embodiment of the present invention.

Using a flow chart of FIG. 3, there will be described the preparation stage for the initial operation when optical disc 70 is inserted into optical disc recording/reproducing apparatus 1 according to an embodiment of the present invention.

First, in optical disc recording/reproducing apparatus 1, disc insertion detecting unit 2 determines whether or not optical disc 70 has been inserted (step S1). When it is determined in step S1 that optical disc 70 has been inserted, the process proceeds to step S2. When it is not determined that it has been inserted, the process remains in step S1.

When optical disc 70 has been inserted, optical pickup 4 is moved to a prescribed position by moving motor 5 and light from optical pickup 4 is focused on optical disc 70 under the control of control unit 20 during the preparation stage for the initial operation (step S2). Here, the prescribed position is a position at which, when the light from optical pickup 4 is focused on, a light spot 40 thereof is applied to a position of optical disc 70 which is closer to the outer periphery by a predetermined distance than the innermost circumference of the recording area (in which unillustrated recording are formed) of optical disc 70.

Next, optical disc 70 is rotated by spindle motor 3 and the rotation of optical disc 70 is accelerated to a predetermined rotation speed (step S3). Namely, in order to perform the initial operation of reading the information recorded at the innermost circumferential side of optical disc 70, it is necessary that optical disc 70 is rotated by spindle motor 3 such that the rotation speed thereof reaches the predetermined rotation speed. As will be described later, with the unrecorded disc detecting method according to the present invention, the determination of an unrecorded disc is performed during the time interval until the predetermined rotation speed is achieved, namely, during the preparation stage for the initial operation.

Next, during the accelerated rotation of optical disc 70, maximum pit formed on optical disc 70 are detected, on the basis of data slice signals output from data slice signal generation unit 8 at the focus-on state (step S4).

Figure 4A:
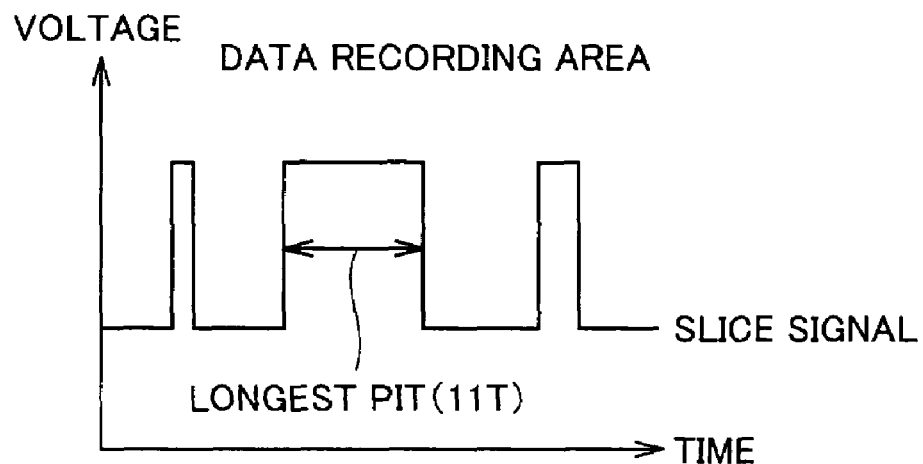
FIGS. 4A and 4B are signal waveform charts for describing a data slice signal output from a data slice signal generation unit in the state of focus-on with respect to an optical disc.
Figure 4B:
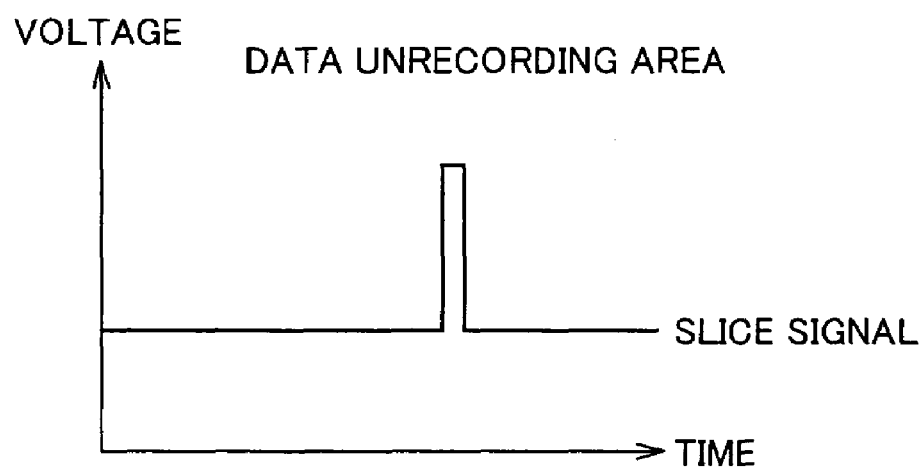

Using FIGS. 4A and 4B, there will be described data slice signals which are output from data slice signal generation unit 8 at the state where light is focused on optical disc 70. FIG. 4A illustrates data slice signals which are output at the state where light is focused on a recorded disc. FIG. 4B illustrates data slice signals which are output at the state where light is focused on an unrecorded disc. The illustrated data slice signals represent signal waveforms when optical disc 70 is rotated at a constant speed. Since data slice signals are formed by binarizing RF signals, when there are formed pits at the focused-on position (namely, when there is recorded information thereat), a number of binary waveforms are output depending on the presence or absence of pits, as illustrated in FIG. 4A. On the contrary, when there is formed no pit at the focused-on position (namely, when there is recorded no information thereat), binary waveforms are hardly output or are output at random, as illustrated in FIG. 4B. On the basis of such data slice signals, control unit 20 detects maximum pit formed on optical disc 70.

On a recorded disc, a plurality of longest pits (11T) having a maximum length are recorded, and such longest pits are used for recording of information onto concentric or centrifugal standard information recording tracks in order to synchronization timings of pits under standards.

Consequently, maximum-value detection circuit 22 detects, from a recorded disc, the pulse-width value of the longest pits which are input from pulse-width counter 21, as a maximum value. Then, maximum-value detection circuit 22 outputs the detected maximum values of the longest pits to determination circuit 24.

Figure 5:
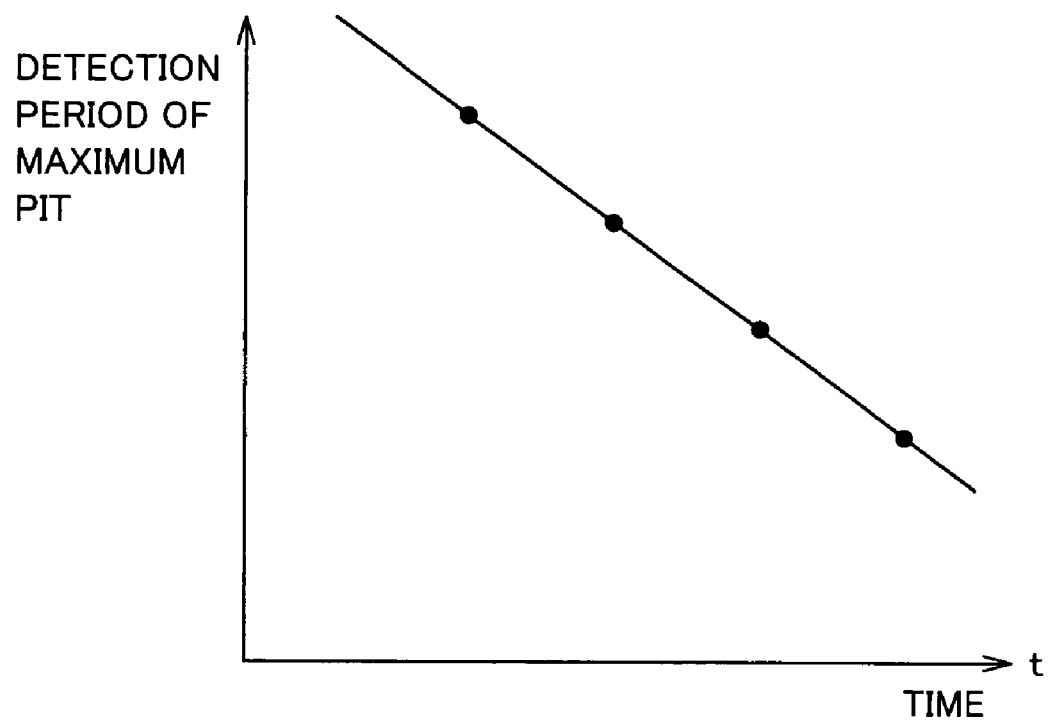
FIG. 5 illustrates a case where a detection period of a longest pit becomes short as a rotation speed increases during high-speed rotation of an optical disc.

Referring to FIG. 3 again, in step S5, determination circuit 24 determines whether or not the detection period of maximum pit is shortened with the acceleration of the rotation of optical disc 70. During the acceleration of the rotation of optical disc 70, the detection period of longest pits is shortened with the acceleration as illustrated in FIG. 5.

Consequently, when the detection period of maximum pit is shortened in step S5, determination circuit 24 can determine that the optical disc is a recorded disc (step S6). For example, determination circuit 24 may make a comparison between the rate of change of the detection period of maximum values with acceleration of the rotation of the optical disc and a predetermined rate, namely, a reference rate, and may perform the determination on the basis of the result of comparison. Also, determination circuit 24 may determine whether or not the rate of change of the period of detection of maximum values is within a certain range.

When it is determined that the optical disc is a recorded disc, control unit 20 determines that information is recorded at the current position and performs track-on of the light from optical pickup 4 at the position and then the information is read. Namely, the aforementioned initial operation is performed. Thus, according to this method, the determination as to whether the optical disc is a recorded disc or an unrecorded disc can be executed during the acceleration of the optical disc to a certain speed prior to performing the initial operation, thus enabling execution of the determination more rapidly than conventional.

On the other hand, from an unrecorded disc including no information recorded thereon, pits are hardly detected or are detected at random; therefore, the period of detection of maximum pit is increased and decreased. Namely, the detection period of longest pits is not shortened with proceeding acceleration.

Thus, in step S8, determination circuit 24, or control unit 20, determines that the optical disc is an unrecorded disc. Then, control unit 20 causes display unit 13 to display an error (warning) (step S9). Also, display unit 13 may display that it is a blank disc instead of displaying an error.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical disc recording/reproducing apparatus comprising:

a control unit which, when an optical disc has been inserted, executes reading of information recorded on said optical disc;

a motor for rotating said optical disc at a predetermined rotation speed in response to commands from said control unit;

an information reading part for applying light to said optical disc in response to commands from said control unit and, also, receiving reflected light from pits recorded on said optical disc to output signals based on said recorded pits; and a determination part for determining the condition of recording of said optical disc on the basis of signals output from said information reading part, wherein said information reading part includes:

an optical pickup for applying light to said optical disc and, also, receiving reflected light from pits recorded on said optical disc to convert the reflected light into electrical signals and, then, output the electrical signals;

a signal processing unit for subjecting electrical signals from said optical pickup to signal processing to generate RF signals;

a data slice signal generation unit for processing said RF signals to generate data slice signals; and a focusing control unit for performing focus-on of light to be applied such that the focus point of the light is positioned on the surface of said optical disc, said determination part determines the condition of recording of said optical disc on the basis of the detection period of signals from longest pits recorded on said optical disc, wherein the period is changed with the acceleration of the rotation of said optical disc until said predetermined rotation speed is achieved, said determination part includes:

a pulse-width counter for measuring the pulse widths of said data slice signals;

a maximum-value detection circuit for detecting the maximum pulse-width value of said longest pits measured by said pulse-width counter; and a determination circuit for calculating the detection period of the maximum values detected by said maximum-value detection circuit and for determining the condition of recording of said optical disc on the basis of the change of the detection period of said maximum values, and said determination circuit determines that said optical disc is a recorded disc when the detection period of the maximum values detected by said maximum-value detection circuit is shortened with the acceleration of the rotation of said optical disc.

2. An optical disc recording/reproducing apparatus comprising:

a control unit which, when an optical disc has been inserted, executes reading of information recorded on said optical disc;

a motor for rotating said optical disc at a predetermined rotation speed in response to commands from said control unit;

an information reading part for applying light to said optical disc in response to commands from said control unit and, also, receiving reflected light from pits recorded on said optical disc to output signals based on said recorded pits; and a determination part for determining the condition of recording of said optical disc on the basis of signals output from said information reading part, wherein said determination part determines the condition of recording of said optical disc on the basis of the detection period of signals from longest pits recorded on said optical disc, wherein the period is changed with the acceleration of the rotation of said optical disc until said predetermined rotation speed is achieved, wherein said information reading part includes:

an optical pickup for applying light to said optical disc and, also, receiving reflected light from pits recorded on said optical disc to convert the reflected light into electrical signals and, then, output the electrical signals;

a signal processing unit for subjecting electrical signals from said optical pickup to signal processing to generate RF signals;

a data slice signal generation unit for processing said RF signals to generate data slice signals; and a focusing control unit for performing focus-on of light to be applied such that the focus point of the light is positioned on the surface of said optical disc, and wherein said determination part includes:

a pulse-width counter for measuring the pulse widths of said data slice signals;

a maximum-value detection circuit for detecting the maximum pulse-width value of said longest pits measured by said pulse-width counter; and a determination circuit for calculating the detection period of the maximum values detected by said maximum-value detection circuit and for determining the condition of recording of said optical disc on the basis of the change of the detection period of said maximum values.

3. The optical disc recording/reproducing apparatus according to claim 2, wherein said determination circuit determines that said optical disc is a recorded disc when the detection period of the maximum values detected by said maximum-value detection circuit is shortened with the acceleration of the rotation of said optical disc.

* * * * *